METHOD FOR ALLOYING IN SUCCESSION PLURAL METALLIC MASSES
AT THE SAME SURFACE PORTION OF A SEMICONDUCTIVE
BODY AND APPARATUS THEREFOR
Filed June 20, 1963

INVENTOR.
R.C.C. WADEY
ALAN L. FARR
BY
Frank R. Trifari
AGENT 3,261,729

METHOD FOR ALLOYING IN SUCCESSION PLURAL METALLIC MASSES AT THE SAME SURFACE PORTION OF A SEMICONDUCTIVE BODY AND APPARATUS THEREFOR

Raymond Clarence Chance Wadey, Ashurst, and Alan Leonard Farr, Shirley, Southampton, England, assignors to North American Philips Company, Inc., New York, N.Y., a corporation of Delaware Filed June 20, 1963, Ser. No. 289,448
Claims priority, application Great Britain, Aug. 22, 1962, 32,255/62
10 Claims. (Cl. 148—179)

Figure 1:
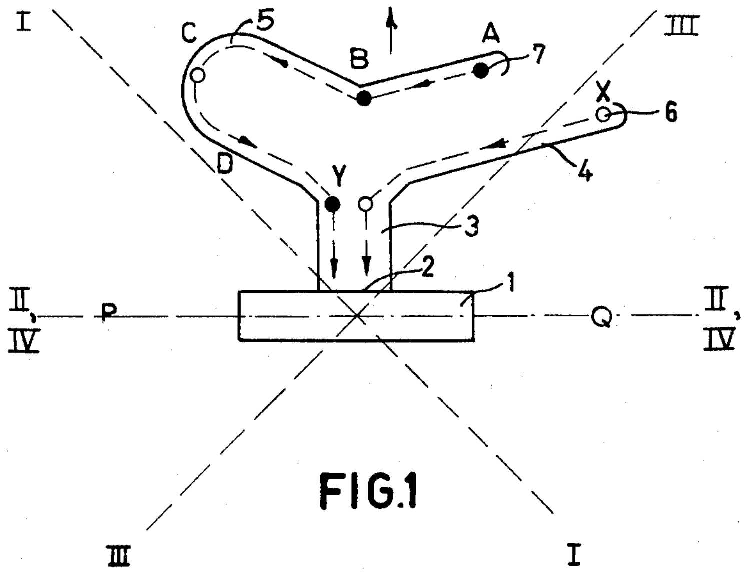

This invention relates to semiconductor devices, to methods of alloying material to semiconductor bodies in the manufacture of such devices and to alloying jigs suitable for use in the manufacture of such devices.

In a method of manufacturing semiconductor devices, for example, transistors and crystal diodes, a semiconductor body and a quantity of material to be alloyed thereto are heated at separate locations in an alloying jig to a temperature higher than the melting point of the material to be alloyed but lower than that of the body, after which the material to be alloyed is caused to flow from its initial location onto the body, for example, by tilting, rotating or inverting the jig. Such a method is described in copending application, Serial No. 115,484, filed June 7, 1961, (now U.S. Patent 3,209,436) and has the advantage that surface films, principally oxides, on the quantity of material and the semiconductor body which in previously used methods of alloying inhibit the even wetting of the body by the material to be alloyed, may be removed if the heating is effected in a reducing atmosphere, for example, of hydrogen.

In the above-mentioned copending application there is described a method of alloying material to semiconductor body, in which quantities of material of different compositions are alloyed in order of succession at one area on the semiconductor body, the semiconductor body being located in an alloying jig at a position which communicates by way of a duct or ducts with a plurality of separate locations for the quantities of material to be alloyed, a first change in the position of the jig causing some of the quantities to flow onto the semiconductor body and a subsequent change or changes in position of the jig causing the remainder of the quantities to flow onto the semiconductor body.

Such a method may be employed when the quantities of material to be alloyed contain different active impurities, that is, acceptors and donors, and which have a great difference of diffusion velocity in the semiconductor body. By providing each of these active impurities in a separate quantity of material to be alloyed, different alloying temperatures and alloying periods may be adjusted for these impurities.

The method may also be used to alloy aluminum-containing material to a semiconductor body. It is found that aluminum cannot be directly alloyed to a semiconductor body of, for example, germanium, and an aluminum-alloy material can only be alloyed directly to such a semiconductor body with great difficulty. Such an aluminum alloy material can be more readily alloyed to a semiconductor body which has previously been alloyed with other material, for example, indium.

In the method described, the problem arises that it is difficult to obtain an even wetting of the part of the semiconductor body which the molten material to be alloyed flows onto and hence an even penetration of the alloying front into the body is difficult to achieve. The known methods and apparatus suffer from the disadvantage that on at least one change of position of the jig to cause a quantity of material to be alloyed to flow onto the body, the body is moved into a position in which a surface at which alloying is to be effected is in an inclined position which renders it difficult to obtain an even wetting of the surface and an even penetration of the alloying front.

According to a first aspect of the invention, there is provided a method of alloying first and second quantities of material in order of succession at an area on the surface of a semiconductor body in an alloying jig, in which the two quantities are initially provided in the jig at separate first and second locations or sites and the body is provided in a recess in the jig with the surface initially inclined to the horizontal, heating the jig and contents in a furnace to a temperature above the melting point of the first quantity and below that of the body, tilting the jig to an alloying position at which the surface is horizontal and at which the first quantity flows from the initial location onto the body, subsequently heating to a temperature above the melting point of the second quantity and below that of the body, tilting the jig to a position in which the second quantity flows to an intermediate location and then tilting back to the allowing position at which the surface is horizontal and at which the second quantity flows from the intermediate location onto the body.

The quantities of material may flow along channels formed by a groove provided in a surface of the jig which extends substantially parallel to the surface of the semiconductor body and thence into a channel formed by a bore in the jig extending from the lowest part of the groove below the said surface of the jig to the recess.

The quantities of material may flow onto the body through the bore when the surface of the body is horizontal, the bore extending substantially at right angles to the surface of the body.

The groove may be substantially U-shaped, the locations for the quantities of material being situated at or near the ends of each limb of the U.

The bore may be situated near the center of a limb of the U and the intermediate location may be situated in the groove between the bore and the end of the other limb of the U.

A third quantity of material may be alloyed in order of succession to a part of a further surface of the semiconductor body, the third quantity being initially provided in the jig at a separate location, the jig and contents being heated to a temperature above the melting point of the third quantity of material and below that of the body and the jig inverted to a position at which the third quantity flows from the location onto the said part of the further surface of the body.

The semi-conductor body may consist of germanium, the first quantity may consist of indium, the second quantity may consist of an alloy of germanium, indium and aluminum, and the third quantity may consist of indium.

According to a second aspect of the invention, there is provided an alloying jig for alloying first and second quantities of material in order of succession at an area on a surface of a semiconductor body, comprising a recess for the body, first and second locations or sites for the quantities of material communicating with the recess by way of channels, the contours of the channels over which the material is adapted to flow from the locations to the recess being shaped such that when the jig is tilted from a position at which the surface is inclined to the horizontal to a position in which it is horizontal, the first quantity flows onto the surface, on further tilting the second quantity moves to an intermediate location in one of the channels and on a subsequent tilting back to the position in which the surface is horizontal flows onto the surface.

The channels may consist of a groove provided in a surface of the jig which extends substantially parallel to the surface of the semiconductor body and a bore in the jig extending from the groove to the recess and situated at the lowest part of the groove below the said surface of the jig.

The bore may extend substantially at right angles to the surface of the semiconductor body.

The groove may be substantially U-shaped, the locations for the quantities of material being situated at or near the ends of each limb of the U.

The bore may be situated near the center of a limb of the U and the intermediate location may be situated in the groove between the bore and the end of the other limb of the U.

The jig may comprise a first substantially rectangular block in which the locations for the quantities of material and the channels are provided, the block being clamped to a second substantially rectangular block, the recess being provided between adjacent clamped surfaces in one or both of these surfaces.

The second block may comprise a bore extending from the recess into the block and terminating in a third location for a quantity of material to be alloyed to a further surface of the semiconductor body.

Figure 2:
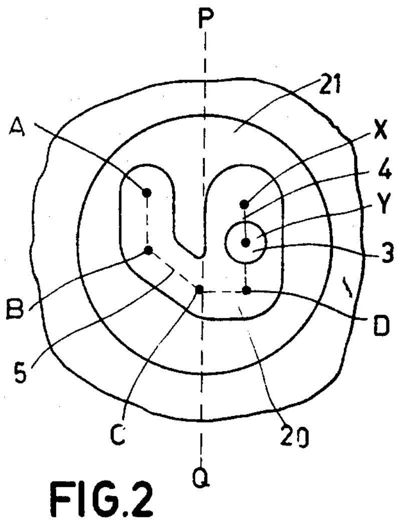
Figure 3:
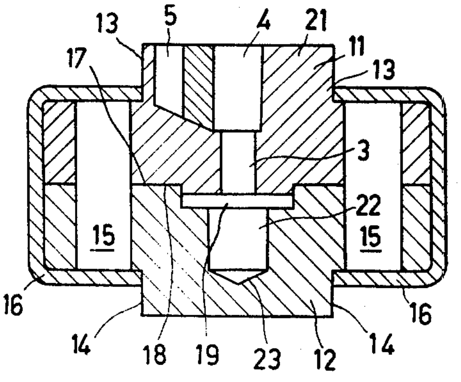
Figure 4:
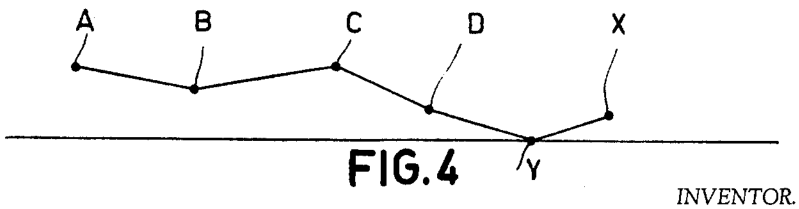

In order that the invention may be readily carried into effect, an embodiment of the method and the alloying jig according to the invention will now be described, by way of example, with reference to the accompanying drawing, in which FIGURE 1 is a diagrammatic representation of the various locations in an alloying jig of two separate quantities of material relative to the surface of a semiconductor body, to which the quantities are to be alloyed in order of succession, for various positions of the jig;

FIGURES 2 and 3 are a part plan view and a vertical section respectively of an alloying jig according to the invention and FIGURE 4 is a diagrammatic representation of the surface contour of a liquid path within the jig shown in FIGURES 2 and 3.

The broadest principles of the method according to the invention will now be described with reference to FIGURE 1. A semiconductor body 1 is positioned in a recess of an alloying jig with a surface 2 of the body 1, to a part of which alloying is to be effected, extending at right angles to a channel 3 between the recess and further channels 4 and 5 in the jig. The jig is initially positioned with the axis P–Q of the body, which is parallel to the surface 2, in a position inclined to the horizontal as indicated by the broken line I—I. Two separate quantities of alloying material 6 and 7 are now placed in separate sites or locations at the terminations of the channels 4 and 5 respectively, their positions being represented by X and A respectively. The jig and contents is now heated to a temperature above the melting point of the quantity of alloying material 6 and below the melting point of the body 1 and then tilted so that the surface 2 of the body 1 is horizontal with the axis P–Q lying along the broken line II—II. In this tilting movement, the quantity of alloying material 6, which is now molten, flows along the channel 4 and when the surface 2 of the body 1 becomes horizontal, flows to the position Y in the channel 3 and then drops onto the surface 2 of the body 1 to alloy therewith. The quantity of material 6 flows onto the body 1 at the moment the surface 2 is horizontal and evenly wets the surface and the penetration of the alloying front into the body 1 is uniform. During this tilting, the quantity of alloying material 7, which may or may not be molten, is caused to move to a position B in the channel 5.

After sufficient time has elapsed for the desired alloying of the quantity of alloying material 6 to the body 1, the jig is further tilted in the same direction to a position in which the surface 2 is inclined to the horizontal with the axis P–Q lying along the broken line III—III. During the tilting, the quantity of material 7 is caused to move along the channel 5 past a highest position C in the channel to an intermediate site or position D. The quantity of alloying material 7 may or may not be molten during this tilting, the essential condition being that its physical state allows it to be free to move under gravity in the channel 5.

The jig and contents are now heated to a temperature above the melting point of the quantity of alloying material 7, if this temperature has not already been attained during the first stage of the method, and below the melting point of the body 1. The jig is then tilted back in the opposite direction so that the surface 2 of the body 1 again becomes horizontal with the axis P–Q now lying along the broken line IV—IV which is coincident with the broken line II—II. During the tilting movement the quantity of alloying material 7, which is now molten, flows along the channel 5 and when the surface 2 of the body 1 becomes horizontal, flows to the position Y in the channel 3 and then onto the surface 2 of the body 1 to alloy therewith at the region where the quantity of alloying material 6 was alloyed. Thus an even wetting of the surface by the molten material 7 to be alloyed is effected due to the horizontal disposition of the surface 2 at the moment when the material flows onto the body and hence an even penetration of this material through the previously formed alloy region occurs.

In FIGURES 2 and 3, an alloying jig is shown comprising first and second substantial rectangular-shaped blocks 11 and 12 of graphite. The blocks have cutaway portions 13 and 14 respectively and are held together with the aid of graphite dowel pins (not shown) fitting into bores 15 in the blocks. A stainless steel clip 16 serving to clamp the blocks together is attached to the jig at the cutaway portions and the clip is provided with a spindle (not shown) which enables the jig to be tilted by mechanical means when present in a furnace.

Adjacent surfaces 17 and 18 of blocks 11 and 12 respectively are secured together and are shaped to define a recess 19 of square section for a semiconductor body. The block 11 has two channels 4 and 5 formed by a U-shaped groove 20 cut in the upper surface 21 of the block and a further channel formed by a bore 3 between the groove 20 and the recess 19 extending at right-angles to the main surface of the recess 19. A diagrammatic part plan view of the upper surface 21 of the block 11 is shown in FIGURE 2, the positions A, B, C, D, X and Y in the groove 20 corresponding with those described with reference to FIGURE 1. FIGURE 4 shows the relative surface contours of the groove 20 along the line ABCDYX, the lowest point being Y corresponding to the top of the bore 3. In carrying out the method according to the invention the actual paths followed by two quantities of material 6 and 7 to the position Y from their initial locations X and A respectively correspond substantially to the lines XY and ABCDY, respectively.

The block 12 has a bore 22 extending at right angles to the recess 19 and terminating in an initial location 23 for a quantity of material to be alloyed to surface of a semiconductor body present in the recess.

An example of a method of alloying material to a semiconductor body, in the manufacture of a power transistor, using the jig shown in FIGURES 2 and 3 will now be described. This jig is initially dismantled and assembled with the incorporation of a semi-conductor body and materal to be alloyed thereto in the following order. A slug of indium of 60 mg. weight is placed in the location 23 at the termination of the bore 22 in the block 12. A square wafer of n-type germanium of 25 mm. thickness and surface area 25 sq. mm. is placed on the surface 18 of the block above bore 22 at a position corresponding to the recess 19 defined by the surfaces 17 and 18. The block 11 is then placed on the block 12, graphite dowel pins inserted on the bores 15 to hold the blocks together and then the clip is provided on the assembly. The jig is then tilted about a horizontal axis lying in the plane of FIGURE 2 so that the major surfaces of the germanium wafer are inclined at an angle of 45° to the horizontal with the ends of the limbs of the U-shaped groove lying uppermost. A slug of indium of 30 mg. weight is placed at the end of the channel 4 in the groove at a position corresponding to the location X (FIGURES 2 and 4) and a pellet of an alloy of germanium, indium and aluminum (GeAlIn) of 20 mg. weight is placed at the end of the channel 5 in the groove at a position corresponding to the location A (FIGURES 2 and 4).

The loaded jig is now inserted in the same tilted position in a furnace having a reducing atmosphere of hydrogen and a temperature of 550° C. at which temperature the slugs of indium and the pellet of GeAlIn are both molten, the action of the reducing atmosphere being to render the surfaces of the pellet and slugs free of any oxide coating. After heating for approximately 30 minutes the temperature is reduced to 400° C. and the jig is then tilted back about the same axis by mechanical control means so that the major surfaces of the germanium wafer are again horizontal. During this tilting movement the slug of indium, located in the channel 4, which forms into a spherical pellet on melting, flows along the channel 4 in the groove 20 to the position Y at which it drops through the bore 3 onto the upper surface of the germanium wafer and alloys therewith, while the pellet of GeAlIn moves to the position B in the channel 5. After approximately 30 seconds during which time the indium alloys with germanium the jig is tilted by mechanical means in the opposite direction about the same axis through an angle of 45° during which movement the GeAlIn pellet moves beyond the highest part C of the channel 5 to an intermediate location D. The jig is then tilted back to the horizontal position, during which movement the GeAlIn pellet moves from the intermediate location D to the position Y and then drops onto the germanium wafer at the position at which the indium has been alloyed. After approximately 30 seconds during which time the aluminum in the GeAlIn pellet diffuses through the previously alloyed region to form a p-type emitter region the jig is inverted and the indium pellet located in the bore 22 drop onto the opposite surface of the germanium wafer to alloy therewith and form a p-type collector region. After sufficient time has elapsed to effect the alloying the jig and contents are removed from the furnace and cooled.

What is claimed is:

1. An alloying jig for alloying in succession plural metallic masses at a surface portion of a semiconductive body, comprising heat-resistant members defining a recess for accommodating the semiconductive body and exposing a surface portion thereof, said heat-resistant members defining a plurality of channels terminating at said exposed surface portion of the body, each of said channels containing a first site separate from the others and remote from the body for stably retaining one of said masses for alloying to the body when the jig is positioned in a first position such that the said surface portion of the body is inclined to a horizontal plane, one of said channels having a construction at which, when the jig is moved to a second position wherein the said body surface portion is horizontal, the mass located in its first site becomes unstable causing it to flow along the channel and fall onto the said body surface portion, another of said channels having a construction at which, when the jig is moved to said second position from the first position, the mass located in its first site becomes unstable causing it to flow along the channel to a second site intermediate the first site and the said body surface portion wherein it is stably retained, and when the jig is rotated to a third position wherein the said body surface portion is inclined to a horizontal plane, the mass becomes unstable in the second site and flows along the channel to a third site intermediate the second site and the said body surface portion wherein it is stably retained, and when the jig is rotated back to the second position wherein the said body surface portion is horizontal the mass becomes unstable and is caused to flow along the channel and fall onto the said body surface portion.

2. A jig as set forth in claim 1 wherein the jig contains a vertical bore terminating at its lower end at the recess accommodating the semiconductive body and terminating at its upper end at said one and said other channels, said channels constituting grooves formed in the top surface of the jig and extending substantially parallel to the surface of the semiconductive body.

3. A jig as set forth in claim 2 wherein the channels form a substantially U-shaped groove with the bore terminating in the vicinity of the center of a limb of the U.

4. An alloying jig for alloying in succession plural metallic masses at the same surface portion of a semiconductive body, comprising heat-resistant members defining a recess for accommodating the semiconductive body and exposing a surface portion thereof, said heat-resistant members defining a plurality of channels extending above the recess and terminating at said exposed surface portion of the body, each of said channels containing a first site separate from the others and remote from the body for stably retaining one of said masses for alloying to the body when the jig is positioned in a first position such that the said surface portion of the body is inclined to a horizontal plane, one of said channels having a construction at which, when the jig is rotated about a given axis to a second position wherein the said body surface portion is horizontal, the mass located in its site becomes unstable causing it to flow along the channel and fall onto the body surface portion, means in another of said channels for stably retaining its associated mass in a position intermediate the first site and the said body surface portion when the jig is rotated from the first to the second position but which allows the mass to flow further along the channel to a third site when the jig is rotated about the said given axis from the second to a third position in a direction opposite to said first position and wherein the said body surface portion is inclined to a horizontal plane, whereby the jig is rotated about said given axis back to the second position wherein the said body surface portion is horizontal, the mass becomes unstable and is caused to flow along the channel and fall onto the said body surface portion.

5. A jig as set forth in claim 4 wherein the said other channel comprises a groove in the jig upper surface having a higher region at an intermediate location forming the first and second stable sites on one side thereof and the third site on the other side thereof.

6. A jig as set forth in claim 5 wherein the one and the said other channel define a generally U-shaped groove with the first sites located generally at the ends of each limb of the U.

7. A jig as set forth in claim 6 wherein the said higher region is located in the vicinity of the bight portion of the U.

8. A method for alloying in succession plural metallic masses at the same surface portion of a semiconductive body held in a jig with a surface portion thereof exposed, said jig defining a plurality of channels terminating at said exposed surface portion of the body with each of said channels containing a first separate site remote from the body, locating in said first sites said masses for alloying to the body with the jig positioned in a first position such that the said surface portion of the body is inclined to a horizontal plane, one of said channels having two stable sites including the first site and the position of the semiconductive body and another of said channels having four stable sites including the first site and the position of the semiconductive body and further including two additional intermediate sites, heating the jig at a temperature at which at least the mass in said one channel becomes molten, rotating the jig to a second position wherein the said body surface portion is horizontal whereby the mass located in the first site of said one channel becomes unstable causing it to flow along the channel and fall onto the said body surface portion, and whereby the mass located in the first site of said other channel becomes unstable causing it to flow along the channel to a second site intermediate the first site and the said body surface portion wherein it is stably retained, rotating the jig to a third position wherein the said body surface portion is inclined to a horizontal plane whereby the mass located in said other channel becomes unstable in the second site and flows along the channel to a third site intermediate the second site and the said body surface portion wherein it is stably retained, and rotating the jig back to the second position wherein the said body surface portion is horizontal whereby the last-named mass becomes unstable and is caused to flow along the channel and fall onto the same said body surface portion, said jig having been heated at a temperature at which the mass in said other channel is molten at the time it falls onto the semiconductive body.

9. A method as set forth in claim 8 wherein the jig is rotated to its various positions about a single axis, and in the first position the jig is tilted to one side and in the third position the jig is tilted to the opposite side.

10. A method as set forth in claim 9 wherein the semiconductive body is of germanium, one mass includes indium, and the other mass includes aluminum.

References Cited by the Examiner

UNITED STATES PATENTS 2,913,642 11/1959 Jenny -------------- 148—179

FOREIGN PATENTS 794,128 4/1958 Great Britain.

HYLAND BIZOT, *Primary Examiner.*

R. O. DEAN, *Assistant Examiner.*